Dec. 16, 1952   J. L. PATRICK   2,621,766
CUTOFF FOR FUEL CONTROL OF MOTOR VEHICLES
Filed Jan. 28, 1950   2 SHEETS—SHEET 1
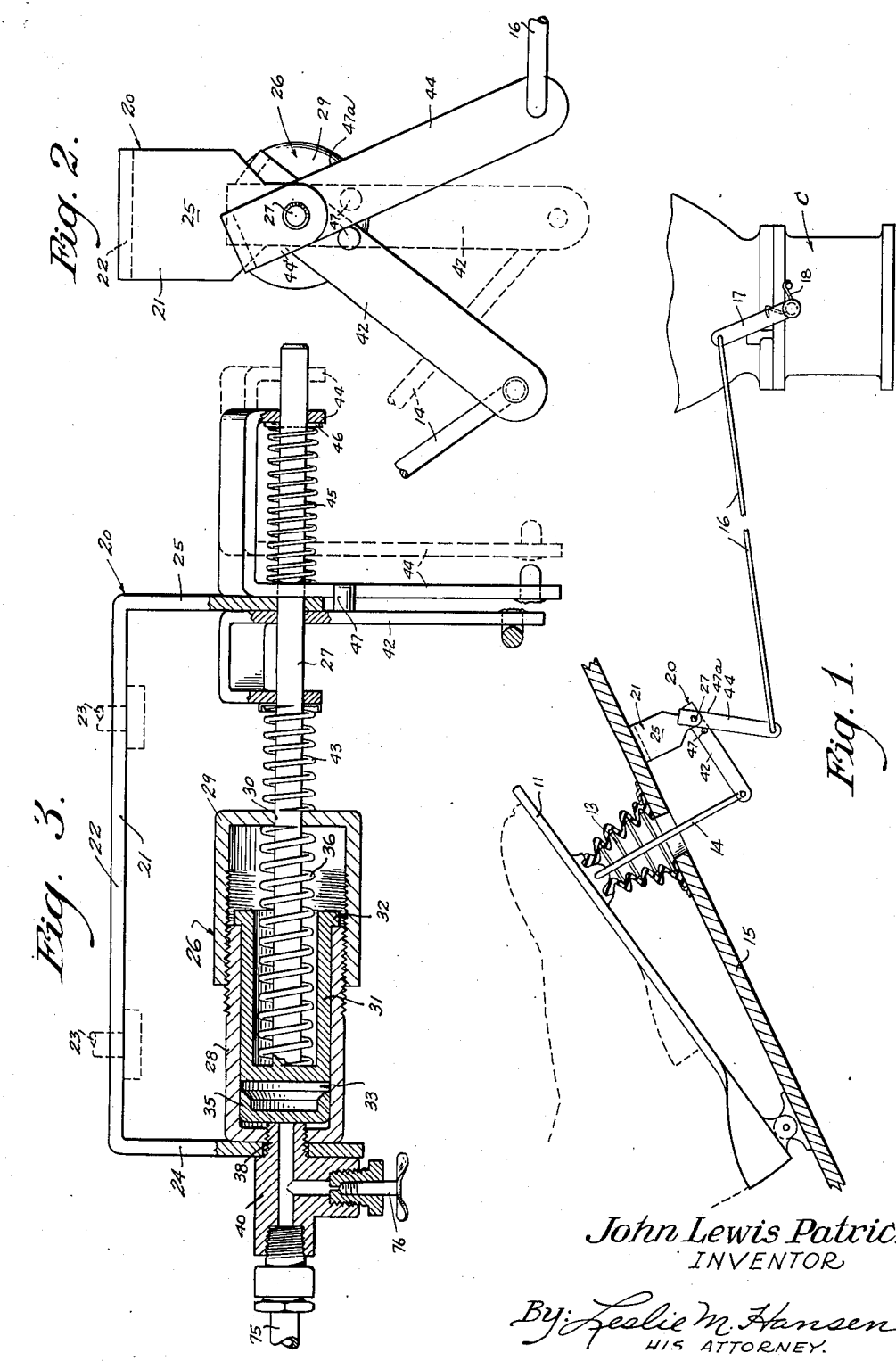
John Lewis Patrick
INVENTOR
By: Leslie M. Hansen
HIS ATTORNEY.

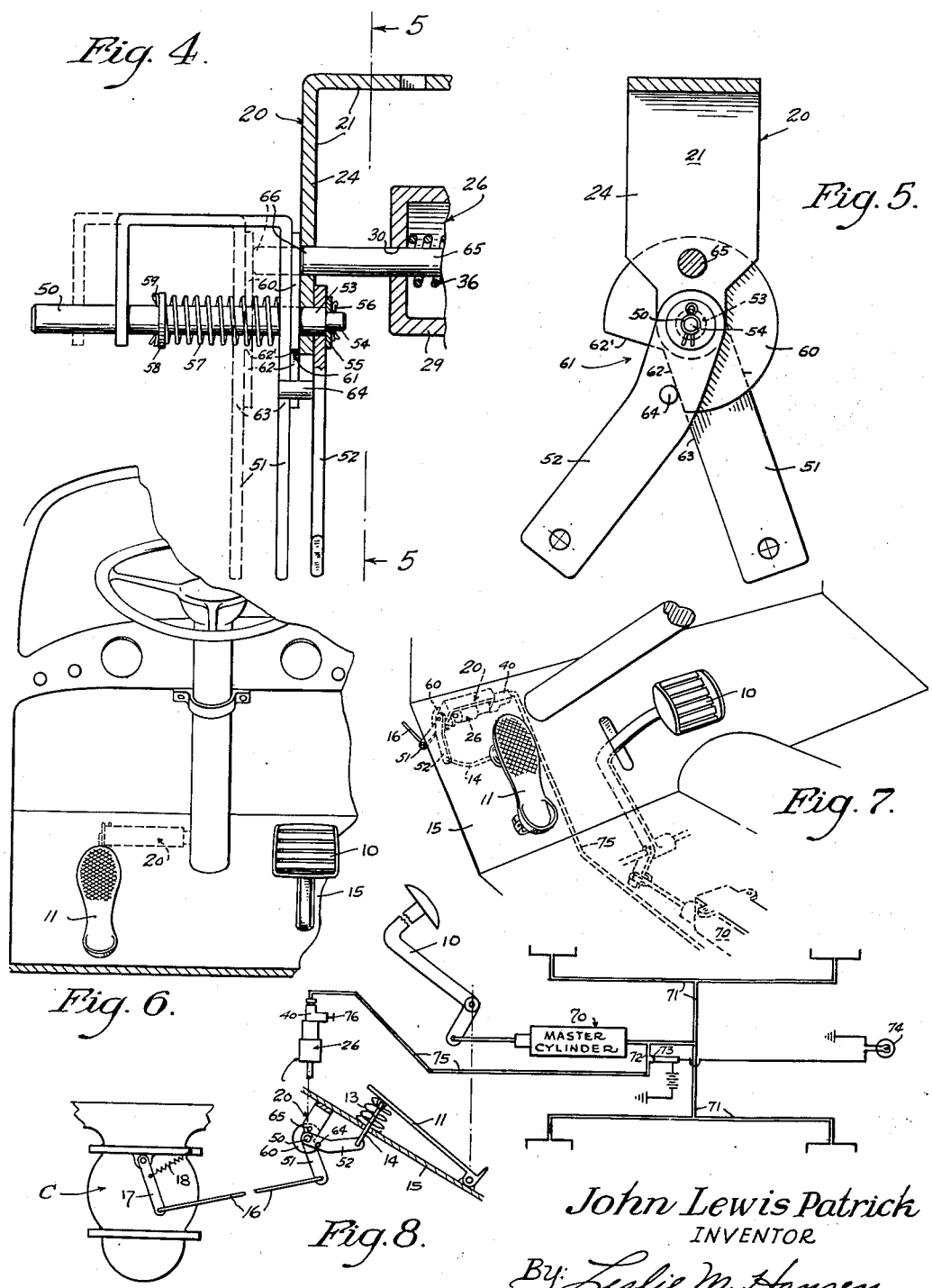

Patented Dec. 16, 1952

2,621,766

UNITED STATES PATENT OFFICE 2,621,766

CUTOFF FOR FUEL CONTROL OF MOTOR VEHICLES

John Lewis Patrick, San Jose, Calif.

Application January 28, 1950, Serial No. 141,030

7 Claims. (Cl. 192—3)

This invention relates to control mechanism for automotive and like vehicles and more particularly to an automatic safety cut-off for the fuel control system of such vehicles.

This invention is particularly concerned with a device for cutting off the fuel control automatically upon operation of the brake system of the vehicle.

One object of this invention is to provide an automatic cut-off which is effective substantially simultaneously with the braking action of a vehicle so as to assure deceleration of its motor speed in less time than is normally possible by human reflexes.

Another object is to provide a device for automatically cutting off acceleration of the motor speed of a vehicle substantially simultaneously with the operation of the brake system thereof to prevent the driver of the vehicle from accelerating the motor speed of the vehicle by reason of emotional impulse due to excitement.

These and other objects and advantages will become apparent from the following description and claims when read in the light of the drawings in which:

Fig. 1 is an illustration showing the present invention embodied in an accelerator system for a vehicle.

Fig. 2 is an enlarged end view of a unit embodied in the present invention and as shown in Fig. 1.

Fig. 3 is a side elevation of the unit shown in Fig. 2, partially broken away and in section for purposes of illustration.

Fig. 4 is a fragmentary side view partly in section illustrating a modified form of the unit shown in Figs. 1, 2 and 3.

Fig. 5 is a section of Fig. 4 taken along line 5—5 thereof.

Fig. 6 is an illustration of the interior of a vehicle having the present invention installed therein in the driver's area thereof.

Fig. 7 is a fragmentary perspective view of the illustration of Fig. 6 and showing in dotted lines the unit of Figs. 1 to 3 or 4 and 5 associated with certain portions of a conventional vehicle.

Fig. 8 is a schematic diagram of the accelerator and brake system of a conventional vehicle associated with the present invention.

With the advent of automatic clutches and gear shift controls in automotive vehicles it is no longer necessary to provide a clutch pedal therein. The present invention, as shown in Figs. 6 to 8 inclusive, contemplates the provision of a brake pedal 10 disposed for operation by the right foot of the driver and an accelerator pedal 11 disposed for operation by the left foot of the driver. In this manner there is no time loss in transferring the left foot from accelerator to brake pedal as was customary prior to this invention.

The accelerator pedal is held in upraised position by a spring 13 and has a push rod 14 extending through the floor board 15 of the vehicle for connection to a link 16 pivotally connected to the throttle arm 17 of a carburetor C. The arm 17 is urged to normal or idling position by a spring 18 which assists the spring 13 returning the accelerator pedal 11 to upraised position.

A unit 20 is embodied in the foregoing arrangement of parts by being interposed between the push rod 14 and the link 16. Under normal driving conditions the result is the same as before because depression of the pedal 11 effects operation of the throttle arm 17 against the action of the return spring 18. However, the unit 20 is so constructed as to serve under certain conditions as a cut-off whereby to disconnect the pedal 11 from the throttle arm 17 so that the return spring 18 will hold arm 17 in idling position irrespective of operation of the accelerator pedal.

Referring now to Figs. 2 and 3, wherein the preferred form of the unit 20 is illustrated as comprising a mounting bracket 21 having a back-bone 22 adapted to be secured by bolts or the like 23 to the underside of the floor board 15. This back-bone 22 is provided at its ends with depending arms 24—25 in alignment with each other to support a cylinder 26 and a piston rod 27.

The cylinder 26 comprises a base cylinder 28 provided with outside threading to receive a cap cylinder 29 provided with an opening 30 through which the piston rod 27 can slide. The base of the rod 27 is formed with or otherwise secured to a piston 31 slidably arranged in the base cylinder and having an out-turned flange 32 adapted to abut the open edge of the same to limit movement of the piston in one direction.

When the piston 31 is in the aforementioned position a certain space 33 is provided between the head of the piston and the head of the base cylinder 28. A plunger 35 is disposed in the space 33 for driving the piston 31 outwardly of the base cylinder when pressure is applied to the opposite side of the plunger. The piston is normally held in the base cylinder by a compression spring 36 disposed around the rod 27 between the cap 29 and the inner side of the piston head.

The base cylinder is secured to the arm 24 by a threaded nipple 38 extending through arm 24 and into a tapped bore in the head of the base cylinder. This nipple 38 is formed on a fitting 40 adapted to abut the arm 24 to secure both the fitting 40 and base cylinder thereto.

An inner lever 42 is rockably mounted on the piston rod 27 just inside the arm 25 on the opposite end of the backbone 22. This lever 42 is normally urged against the arm 25 by a compression spring 43 encompassing the piston rod and bearing against the cap portion of the cap cylinder 29. The lever 42 is provided with an offset portion simulating a bearing boss for maintaining the lever in proper position for rocking movement about the piston rod.

The piston rod extends through the arm 25 and from it a substantial distance to receive and support an outer lever 44 for rocking movement. This outer lever also has an offset portion 44' spaced from its main portion to assure true radial support thereof. A compression spring 45 encircles that portion of the piston rod between the main and offset portions of the outer lever. This spring 45 is pressed toward the main part of the lever 44 by a cotter pin 46 at the far end of the spring 45, the pin 46 extending through the rod 27 at a position to compress the spring 45.

As best seen in Fig. 2, the inner lever 42 carries a lug pin 47 adapted to bear against one side edge 47' of the outer lever 44. It is this linkage which constitutes the cut-off between the push rod 14 from the accelerator pedal 11 and the link 16 from the throttle arm 17, see Figs. 1 and 8. Consequently, upon depression of the accelerator pedal and push rod 14 the motion is transmitted through inner lever 42 by way of pin 47 to outer lever 44 and thence to the link 16 and throttle arm 17.

It should be noted that the return spring 18 on throttle arm 17 is tensioned to effect a definite force to the outer lever 44 whereby to keep its one edge in bearing engagement with the pin 47 which extends from the inner lever 42. However, when pressure is applied to the far side of the plunger 35 the piston 31 and its rod 27 are forced outwardly, to the right, Fig. 3, against the action of spring 36. Simultaneously the cotter pin 46 carried by the piston rod is shifted therewith away from the arm 25 of the mounting bracket 21. Consequently, the cotter pin 46 bears against the offset portion 44' of the outer lever 44 to shift the same away from the bracket arm 25 whereupon the main portion of the outer lever moves out of engagement with the lug pin 47 of the inner lever to disconnect the inner and outer levers from each other.

From the foregoing it will be apparent that the accelerator pedal and its push rod are operatively disconnected from the link 16 and the throttle arm 17. As a result of this cut-off or disconnection, the throttle arm 17 will remain at motor idling position irrespective of any action of the accelerator pedal 11.

The same results are attained when the modified structure of Figs. 4 and 5 is substituted for that of Figs. 2 and 3. This modification employs an additional shaft 50 by which an outer lever 51 is supported for swinging movement. This shaft 50 is supported by and extends from the lower extremity of the bracket arm 24 in parallel relation to the axis of the cylinder 26. In this modification the inner lever 52 is mounted on a portion 53 of the shaft 50 which extends through the arm 24. The portion 53 of shaft 50 has a reduced end 54 carrying a washer 55 and a cotter pin 56 for preventing slippage of the inner lever off of the shaft 50. A compression spring 57 on shaft 50 has one end anchored relative thereto by a collar 58 and a cotter key 59. The opposite end of this spring bears against the outer lever 51 to yieldably urge it toward the bracket arm 24 and to maintain the inner lever 52 against the arm 24.

The outer lever 51 carries a disc 60 axially disposed relative to the shaft 50 and this disc has a segmental cutaway portion 61, one margin 62 of which lies adjacent and coincident to one edge 63 of the outer lever. The inner lever 52 carries a lug pin 64 which normally bears against the margin 62 of the segmental cut out of the disc and the edge 63 of the outer lever.

The piston rod 65 of the modification extends through the bracket arm 24 as in the preferred form for guidance axially. However, the piston rod terminates at the outer face of the arm 24 when its piston (not shown) is in retracted position. Thus the end 66 of rod 65 bears against the adjacent face of the disc 60 which is carried by the outer lever 51.

It will be apparent that outward axial movement of the piston rod 65 is effected by the application of pressure on the far side of its plunger and piston in the manner as described in connection with the structure of Fig. 3. This outward movement of the rod 65, as shown in dotted lines, Fig. 4, causes the disc 60 and outer lever 51 to be shifted outwardly along the shaft 50. Thus the driving linkage between the inner and outer levers is disconnected by reason of disengagement of the lug pin 64 with the margin 62 of disc 60 as well as the adjacent edge 63 of outer lever 51.

The modified structure of Figs. 4 and 5 is shown in Fig. 8 wherein like parts as hereinbefore described in connection with the preferred embodiment of the invention are indicated by like reference numerals. Since the inner lever 52 is connected to push rod 14 and the outer lever 51 connected to link 16, it will be apparent that when these inner and outer levers are disconnected in the manner just explained, the throttle arm 17 will remain in motor idling position irrespective of the position of the accelerator pedal 11.

In connection with the foregoing it will be apparent that the inner and outer levers of both forms of the cut-off unit 20 may be reversed in such a manner that the rod 14 becomes a pull rod and the throttle arm 17 thereby pulled into motor accelerating positoin. When the action of the rod 14 is thus reversed the lug pin 47 will be disposed to engage the edge 47a of the outer lever 44 and in the case of the modified structure the lug pin 64 will engage the opposite margin 62' of the cut out portion of the disc 60. In all other respects the purpose and operation of the devices remain the same.

The means for applying pressure to the far side of the plunger in cylinder 26 comprises the hydraulic brake system of the vehicle in which the invention is installed. An exemplification of such a system is shown schematically in Fig. 3 as embodying a master cylinder 70 mechanically or otherwise operatively connected to the brake pedal 19, hereinbefore mentioned. The master cylinder is of conventional structure and contains a hydraulic brake fluid which is transmitted by conduits 71 to the brake mechanisms of all wheels of the vehicle.

When the pressure of the fluid in conduits 71 is increased the pressure in a by-pass tube 72 also increases to effect a valve 73 for energizing an electrical circuit to a stop light 74. When the pressure in by-pass tube 72 is increased beyond a predetermined degree it builds up pressure in an auxiliary tube 75. This auxiliary tube 75 is connected to the fitting 40 as best seen in Fig. 3. The fitting 40 has a bleeder valve 76 for letting air from the tube 75 to assure full capacity of the brake fluid through fitting 40 and against the far side of the plunger 35.

With the control mechanism of the present invention installed in a vehicle the operation is simply the usual foot operation of both accelerator and brake pedal. However, it is preferred that the driver operate the accelerator pedal with the left foot and the brake pedal with the right foot. In this manner no time is lost in lifting one foot from the accelerator pedal and placing that foot on the brake pedal and applying pressure thereto. This time element, although slight, can mean the difference of stopping the vehicle in less distance than would be possible with the present day method.

In addition to the foregoing, deceleration of the motor speed in emergencies is assured due to the automatic action of the hydraulic brake fluid upon the cut-off unit 20. It should be noted that the operation of the plunger and piston of the unit 20 can be varied relative to the fluid pressure in the brake system. This is accomplished by tightening or loosening the cap cylinder 29 relative to the base cylinder 28 to thus change the compressive strength of the spring 36 within the cylinder. In this manner a greater or lesser pressure would be required to push the plunger, piston and rod outwardly of the cylinder according to the desire of the driver.

When the cut-off unit has been operated in the manner explained to break the connection between the inner and outer levers, the latter are reset into operative condition by action of the return spring 18 on the throttle and the spring 13 associated with the accelerator pedal 11. In other words, when the fluid pressure in the brake system subsides, spring 36 causes the piston and its rod to be retracted so that the inner and outer arms are again urged toward each other by the springs 43 and 45 or by the spring 57 in the modified structure. Simultaneously, the spring 18 returns the inner arm to its normal position while spring 13 returns the outer arm into its normal position whereupon the inner and outer arms are automatically operatively connected for accelerating action.

While the disclosure herein is described in specific detail it will be apparent that it is susceptible to structural variations, modifications and alterations without departing from the spirit of my invention. I therefore desire to avail myself of all variations, modifications and alterations as fairly come within the scope of the appended claims.

What I claim as new and desire to protect by Letters Patent is:

1. In a cut-off device for a vehicle having a fluid brake system and a fuel control throttle connected by a breakable intermediate unit with a manually operated means, said intermediate unit between said throttle and the manually operated means comprising a pair of levers mounted for pivotal movement independently of and adjacent each other and for lateral movement relative to each other in a direction parallel to their axes, means for connecting said levers when in proximity to each other for transmitting motion from said manually operated means to said throttle and adapted to disconnect said levers when they are shifted relatively away from each other along their pivotal axes, means for yieldingly urging said levers into proximity with each other, a hydraulic cylinder arranged adjacent said levers and having a piston rod disposed to move axially in a plane to engage one of said levers and adapted when extended to shift said one of said levers relatively away from the other of said levers, and means connecting said hydraulic cylinder to the fluid brake system for extending said piston rod when the fluid in said system is compressed to a predetermined degree of pressure.

2. In a safety cut-off for a vehicle having a manually operated terminal in its driving compartment connected to the throttle arm of the motor of the vehicle and a hydraulic brake system including a cylinder having a piston rod extending therefrom for axial movement, the combination of a bracket for supporting said cylinder, an arm on said bracket having a guide passage aligned coaxial with said piston rod for supporting the same for axial movement, a breakable linkage interposed between the manually operated terminal and said throttle, said breakable linkage comprising a shaft extending from said arm in a direction away from said cylinder and parallel to said piston rod, a pair of levers mounted on said shaft for pivotal movement and for movement laterally with respect to each other along the axis of said shaft, means connecting one of said levers to said manually operated terminal, means connecting the other of said levers to said throttle, means for yieldably urging said levers toward each other, means on one of said levers engageable with the other one of said levers when said arms are urged toward each other for interconnecting said arms for unitary pivotal movement about said axis, and means on one of said levers engageable by said piston rod for movement therewith upon application of the brakes in said vehicle, said hydraulically operated means having a piston rod engaging one of said levers for moving said one of said levers laterally away from the other one of said levers for disconnecting said means for interconnecting the levers to thereby disconnect said throttle from the manually controlled means.

3. A safety cut-off device between the fuel throttle and accelerator pedal of a motor vehicle of the type having a hydraulic brake system, said cut-off device comprising a cylinder communicating with said hydraulic brake system for receiving fluid under pressure therefrom when put under pressure by application of the brakes in said vehicle, a piston in said cylinder, a shaft having one of its ends connected to said piston and its opposite extended end guided for axial movement exteriorly of said cylinder, a pair of levers mounted for independent pivotal movement on said shaft and for independent movement toward and from each other longitudinally of said shaft, one of said levers being connected to said throttle and the other of said levers being connected to said accelerator pedal, means on said one of said levers engageable with said the other one of said levers when they are in proximity to each other for transmitting motion from said accelerator pedal to said throttle, means on said shaft for retaining said one of said levers in a stable position axially thereof in spaced relation to said cylinder, means on said shaft for yieldably urging the other one of said levers toward said one of said levers, and means connecting said shaft to said other one of said levers for urging it away from said one of said levers upon movement of said piston by application of pressure to the fluid in said cylinder.

4. A safety cut-off device disposed between the ends of the linkage connecting the fuel control throttle to accelerator pedal of a motor vehicle of the type having an hydraulic brake system; said cut-off device comprising a cylinder connected with said hydraulic brake system for communication with the fluid in said system, a piston in said cylinder normally retracted into the latter when the fluid in said system is at normal pressure, a shaft having one of its ends connected to said piston and its opposite end guided for axial movement exteriorly of said cylinder, a pair of levers mounted for independent pivotal movement on said shaft and for movement toward and from each other longitudinally of said shaft, one of said levers being connected to that portion of said linkage which is connected to said throttle and the other of said levers being connected to that portion of said linkage which is connected to said accelerator pedal, means on one of said levers engageable with the other one of said levers when they are in proximity to each other for transmitting motion from said accelerator pedal to said throttle, means for maintaining said one of said levers in spaced relation to said cylinder, means on said shaft for yieldably urging the other one of said levers into proximity to said one of said levers, and means connecting said shaft to said other one of said levers for urging the latter away from said one of said levers upon movement of said piston in said cylinder due to increase of pressure in the fluid in said brake system.

5. A safety cut-off device disposed between the ends of the connecting rod between the fuel control throttle and accelerator pedal of a motor vehicle of the type having an hydraulic brake system; said cut-off device comprising a cylinder communicating with said hydraulic brake system, a piston in said cylinder sensitive to the pressure of the fluid therein when said system is put under pressure by application of the brakes in said vehicle, a shaft having one of its ends connected to said piston and its opposite end guided for axial movement exteriorly of said cylinder, a pair of levers mounted for independent pivotal movement upon a common axis parallel to said shaft, one of said levers being shiftable toward and from the other one of said levers longitudinally of said common axis, one of said levers being connected to that portion of said connecting rod connected to said throttle and the other of said levers being connected to that portion of said connecting rod connected to said accelerator pedal, means on one of said levers engageable with the other one of said levers when they are in proximity to each other for transmitting motion from said accelerator pedal to said throttle, means yieldably urging said shiftable one of said levers into proximity to the other one of said levers, and means connecting said shaft to said shiftable one of said levers for urging it away from the other one of said levers upon movement of said piston by an increase of the pressure of the fluid in said brake system and said cylinder.

6. In a safety cut-off between a throttle and a manual means for operating the same on a motor vehicle having an hydraulic brake system, the combination of a cylinder communicating with said hydraulic brake system, a piston in said cylinder, a rod connected to said piston and extending from said cylinder for axial movement away from the latter upon application of the brakes in said vehicle, means for supporting said cylinder in place in said vehicle including an arm having a guide opening for receiving said arm, a lever connected to said throttle and pivotally mounted on one side of said arm, a shaft extending from the opposite side of said arm, a lever pivotally mounted on said shaft for sliding movement therealong and connected to said manually operated means, means for yieldingly urging the lever on said shaft toward said arm, means on one of said levers for engaging the other of said levers for transmitting motion from one of said levers to the other, said lever on said shaft having a portion engageable by said rod for effecting lateral movement of said lever along said shaft away from said arm for disengaging said motion transmitting means whereby said levers rock independently of each other relative to said arm.

7. In a safety cut-off device between the fuel control throttle and accelerator of a motor vehicle of the type having an hydraulic brake system, the combination of a cylinder communicating with said hydraulic brake system for receiving fluid under pressure therefrom upon application of the brakes of said vehicle, a bracket for supporting said cylinder in place including an arm spaced from one end of said cylinder and having a guide opening in axial alignment therewith, a piston in said cylinder, a rod having one end secured to said piston and its opposite end extending into the guide opening in said arm for axial movement therethrough when said piston is effected to move by application of fluid pressure in said brake system, a pair of levers mounted on said arm for swinging movement in a plane transverse to the axis of said rod, one of said levers being disposed on that side of said arm facing said cylinder and the second one of said levers being disposed on the opposite side of said arm remote from said cylinder, one of said levers having operative connection with said throttle and the other one of said levers having operative connection with said accelerator, a breakable link means between said levers comprising a lateral extension on one of said levers adapted to engage one edge of the other one of said levers when both levers are disposed adjacent said arm for effecting unitary movement of said levers upon operation of said accelerator, means for maintaining said one of said levers nearest said cylinder against said arm, yieldable means for normally urging said second one of said levers toward said arm, and means on said second one of said levers extending into the path of movement of said rod for shifting movement therewith when said rod is moved axially from said cylinder to thereby disconnect said connecting means between said levers.

JOHN LEWIS PATRICK.

REFERENCES CITED

The following references are of record in the file of this patent:

UNITED STATES PATENTS

| Number | Name | Date |
|---|---|---|
| 2,183,354 | Lange | Dec. 12, 1939 |
| 2,200,685 | Anderson | May 14, 1940 |
| 2,203,777 | Detmers | June 11, 1940 |
| 2,311,120 | Mossinghoff | Feb. 16, 1943 |
| 2,423,006 | Chambers | June 24, 1947 |
| 2,453,054 | Whiffen | Nov. 2, 1948 |